United States Patent [19]

Rado

[11] Patent Number: 4,626,426
[45] Date of Patent: Dec. 2, 1986

[54] PROCESS FOR THE MANUFACTURE OF CAUSTIC SODA

[75] Inventor: Theodore A. Rado, Oklahoma City, Okla.

[73] Assignee: Kerr-McGee Chemical Corporation, Oklahoma City, Okla.

[21] Appl. No.: 764,110

[22] Filed: Aug. 9, 1986

[51] Int. Cl.$^4$ .............................................. C01F 5/24
[52] U.S. Cl. .................................... 423/641; 423/432
[58] Field of Search .............................. 423/641, 432

[56] References Cited

U.S. PATENT DOCUMENTS

| | | | |
|---|---|---|---|
| 1,500,995 | 7/1924 | Jones | 423/641 |
| 2,802,719 | 8/1957 | Avedikian | 423/432 |
| 2,979,380 | 4/1961 | Miller | 23/66 |
| 3,268,388 | 8/1966 | Bauman et al. | 423/432 |
| 3,920,800 | 11/1975 | Harris | 423/432 |
| 4,451,443 | 5/1984 | Libby | 423/432 |

FOREIGN PATENT DOCUMENTS 182661  7/1922  United Kingdom ................ 423/641

OTHER PUBLICATIONS

*Kirk-Othmer Encyclopedia of Technology*, vol. 1, pp. 740–748 (1964).
K. V. Tkacher, P. S. Remple and I. I. Strezhneva, *Ch. Neorg. Khim*, 1968, 12(12), pp. 3179–3181 (*Chem. Abstracts*, p. 141, vol. 70, 1979).

*Primary Examiner*—John Doll
*Assistant Examiner*—Wayne A. Langel
*Attorney, Agent, or Firm*—William G. Addison; John P. Ward

[57] ABSTRACT

There is provided a process for preparing caustic soda solutions from naturally occurring alkaline minerals comprising double salts of sodium carbonate and calcium carbonate. The process comprises heating said naturally occurring alkaline minerals to temperatures sufficient to dehydrate and partially decarbonate said alkaline minerals and provide an intermediate product of a mixture of sodium carbonate and calcium oxide. This intermediate then is contacted with water to effect causticization of the sodium carbonate and provide a recoverable phase comprising an aqueous solution of caustic soda.

7 Claims, 1 Drawing Figure

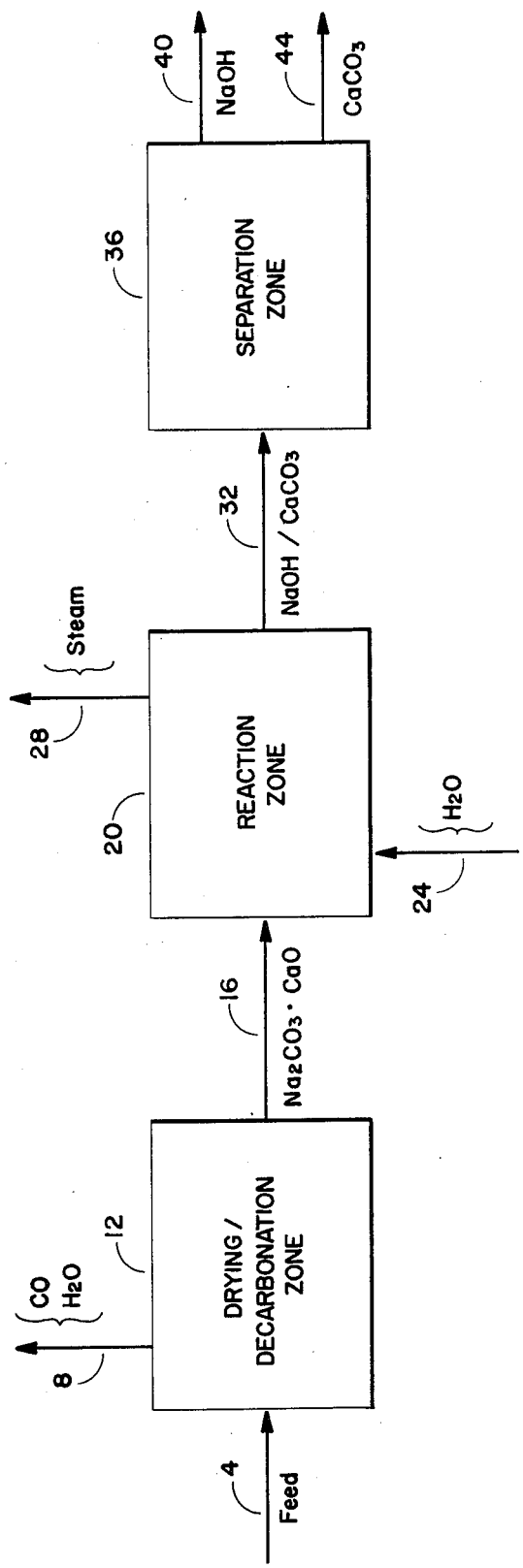

PROCESS FOR THE MANUFACTURE OF CAUSTIC SODA

FIELD OF THE INVENTION

The present invention relates to a novel process for the manufacture of caustic soda. More particularly, the present invention relates to a causticization process wherein the individual reactants, soda ash and lime, are formed in situ from naturally occurring alkaline mineral feed materials.

BACKGROUND OF THE INVENTION

The manufacture of caustic soda (sodium hydroxide) by treatment of soda ash with lime is well known. This method of producing caustic soda generally is referred to in the art as the "causticization" process and involves reacting either soda ash with quick lime (calcium oxide) or soda ash with slaked lime (calcium hydroxide) to produce aqueous solutions containing 10 to 11 percent by weight of caustic soda. Illustrative of the use of the causticization process to produce caustic soda are the disclosures set forth in U.S. Pat. Nos. 2,979,380 and 4,451,443. For a disclosure of various plant operating designs based upon the use of the causticization process reference is made to Kirk-Othmer Encyclopedia of Technology, Vol. 1, ppgs. 740-748 (1964).

From a reading of the Kirk-Othmer reference cited above, it is clear that most caustic soda manufacturing operations, based upon the use of the causticization process, are associated with larger plant complexes for the manufacture of soda ash. One obvious reason for establishing caustic soda manufacturing operations in such close proximity to these larger plant complexes is the ready availability of the soda ash. Another is that the second reactant utilized in the causticization process; i.e., the lime, also is readily available from such soda ash manufacturing complexes as a co-product.

In contrast to the above, the present invention provides a process which can be operated, totally separated and apart from a soda ash manufacturing operation. More particularly, the present invention provides a process for the manufacture of caustic soda totally independent of a need for a separate source of both soda ash and lime.

SUMMARY OF THE INVENTION

It now has been discovered that caustic soda can be manufactured directly from certain naturally occurring alkaline minerals which eliminates the need for separate sources for the soda ash and lime reactants. In accordance with this discovery the present invention provides a process, which can be operated either batchwise or continuously, wherein a naturally occurring alkaline mineral comprised of sodium and calcium carbonates in combination in a molar ratio of about 1:1, said combination further containing from 2 to 5 moles of water of hydration, is heated at elevated temperatures sufficient to remove the water of hydration therefrom and further to partially decarbonate the mineral by the removal of one mole of carbon dioxide per mole of said mineral undergoing heating. The anhydrous and partially decarbonated intermediate product produced by said heating then is contacted with water to produce a reaction product comprised of a mixture of particulated calcium carbonate suspended in a dilute aqueous caustic soda solution. Finally, this mixture is subjected to separation to recover the desired dilute aqueous caustic soda solution.

DESCRIPTION OF THE DRAWING

The single FIGURE is a diagrammatic illustration of the major process steps of the process of the present invention and of the general flow of the materials therein.

DETAILED DESCRIPTION OF THE INVENTION

Referring to the single FIGURE, a feed stream comprising an alkaline mineral as described hereinabove, and preferably an alkaline mineral selected from the group consisting of pirssonite ($Na_2CO_3 \cdot CaCO_3 \cdot 2H_2O$) and gaylussite ($Na_2CO_3 \cdot CaCO_3 \cdot 5H_2O$) is introduced into drying/decarbonation zone 12 through line 4 in the form of a particulated solid.

Within drying/decarbonation zone 12 the particulated alkaline mineral is heated to temperatures sufficient to remove any incidental moisture and the water of hydration associated with the alkaline mineral. In addition, the temperatures employed will be sufficiently high to further cause decarbonation of the alkaline mineral. This decarbonation occurs as a result of the calcium carbonate constituent in the alkaline mineral undergoing decomposition to the corresponding oxide; i.e., calcium oxide with simultaneous expulsion of carbon dioxide. Furthermore, as this decarbonation proceeds the original alkaline mineral undergoes phase transformation from a solid material to a melt and back to a solid material. This final solid material which is referred to hereinafter as the "dried and decarbonated alkaline mineral intermediate product" is friable and will readily fracture upon grinding or contact with the water in reaction zone 20. The water and carbon dioxide generated in drying/decarbonation zone 12 as a result of this heating of the alkaline mineral are both removed from drying/decarbonation zone 12 through conduit 8.

Minimum temperatures at which the above disclosed decomposition can be accomplished generally will range from at least about 750° C. to at least about 850° C. As an example of a specific minimum temperature that could be employed within drying/decarbonation zone 12, it has been reported that the calcium carbonate constituent in the alkaline mineral pirssonite will undergo decomposition to its corresponding oxide beginning at about 770° C. (K. V. Tkacher, P. S. Remple and I. I. Strezhneva, Ch. Neorg. Khim, 1968, 13 (12), ppgs. 3179-81) (Chem. Abstracts, pg. 141, Vol. 70, 1969). In general, higher temperatures; i.e., temperatures greater than 850° C. but less than the decomposition temperature of sodium carbonate, will be employed to provide for a practical and more economical utilization of the novel process of this invention. The specific temperature employed as well as the time of retention of the alkaline mineral within drying/decarbonation zone 12 can readily be determined by one of ordinary skill in the art from the guidelines provided hereinabove.

Drying/decarbonation zone 12 can comprise any vessel or apparatus capable of effecting the drying of the alkaline mineral and decomposition of the calcium carbonate constituent therein to its corresponding oxide. Suitable vessels or apparatus for accomplishing these operations may include, for example, the various rotary and vertical type kilns employed in the manufacture of lime from limestone. Regardless of the type of vessel or apparatus employed, means should be provided therein to prevent sticking of the alkaline mineral to the internal surfaces of the vessel or apparatus as the mineral enters into and passes through its molten phase. One such means, for example, can include providing the vessel or apparatus with a bed of previously recovered dried and decarbonated alkaline mineral and introducing the fresh feed of alkaline mineral into the vessel or apparatus and onto this bed. By such means, the alkaline mineral undergoing treatment within the vessel or apparatus substantially will be prevented from contacting and possibly sticking to the internal surfaces of the vessel or apparatus employed as drying/decarbonation zone 12 as the alkaline mineral passes through the aforementioned molten phase.

Drying/decarbonation zone 12 also may comprise one or more of such vessels or apparatus wherein the alkaline material first is dried or dehydrated. in one vessel and then subjected to decarbonation in a second vessel or series of vessels. When a separate vessel is employed to dry the alkaline mineral the drying will be carried out at about the dehydration temperature for the particular alkaline mineral undergoing treatment. Thus, for example, the alkaline mineral pirssonite would be heated within such drying vessel at a temperature of about 190° C. which corresponds to about the dehydration temperature for this particular mineral. However, temperatures ranging from about 150° C. up to temperatures less than about the decomposition temperature of the calcium carbonate constituent in the alkaline mineral undergoing treatment generally can be utilized. Preferably, drying temperatures ranging from about 175° C. to about 300° C. will be employed.

As disclosed hereinabove, the dried and decarbonated alkaline mineral intermediate product exits drying/decarbonation zone 12 through conduit 16 as a friable solid. It is conveyed by conduit 16 to reaction zone 20. The dried and decarbonated intermediate product, which is comprised of sodium carbonate and calcium oxide, is contacted in reaction zone 20 with sufficient water to effect substantial causticization of the sodium carbonate in the intermediate product to the desired caustic soda.

The water required for effecting the causticization of the sodium carbonate in the dried and decarbonated intermediate product is introduced into reaction zone 20 through conduit 24. The quantity of water introduced into reaction zone 20 will be an amount at least equivalent to the theoretical amount required to effect hydration of the calcium oxide in said dried and decarbonated intermediate product. Generally, however, the quantity of water introduced into reaction zone 20 will be an amount in excess of the theoretical amount and sufficient to counteract the loss of water as steam. This steam, which is removed from reaction zone 20 through conduit 28, is generated by the contact of the water with the hot intermediate product as well as by the appreciable heat of hydration which occurs as the water and calcium oxide react to form the calcium hydroxide necessary to the causticization reaction. Therefore, in the practice of the process of the present invention the quantity of water introduced into reaction zone 20 via conduit 24 will be an amount equal to the theoretical amount plus an excess of at least about five percent.

Within reaction zone 20 the mixture of dried and decarbonated intermediate product recovered from drying/decarbonation zone 12 and the water introduced by way of conduit 24 will be maintained in a state or condition of continuous agitation. Such continuous agitation is necessary to provide for intimate contact between the dried and decarbonated intermediate product and the water in order to achieve the desired rate and degree of hydration of the calcium oxide and a causticization of the sodium carbonate constituents. Any vessel or apparatus, or series of two or more vessels or apparatus capable of providing for continuous agitation of the intermediate product and water during the hydration and causticization step can be employed as reaction zone 20. One type vessel which may be particularly useful is that employed in the manufacture of hydrated lime and commonly referred to as a hydrator.

Upon completion of the hydration and causticization in reaction zone 20 the resulting product which is a mixture of particulated solid calcium carbonate suspended in an aqueous solution of caustic soda is removed from reaction zone 20 by conduit 32 and conveyed therein to separation zone 36. Separation zone 36 can be any vessel capable of effecting separation of the suspended calcium carbonate and aqueous caustic soda solution which then are removed from separation zone 36 through conduits 44 and 40, respectively. Examples of vessels which can be employed to separate these materials include any of the known separation devices such as, for example, settling tanks, cyclones, filtration devices such as centrifuges and rotating drums, and the like.

The aqueous caustic soda solutions prepared and recovered in accordance with the process of this invention will contain about 10 to 11 percent by weight of caustic soda. These solutions may be packaged and sold as is or concentrated by known means to provide solutions containing up to 50 percent by weight or more of the caustic soda.

While certain embodiments and details have been shown for the purpose of illustrating this invention, it will be apparent to those skilled in this art that there are changes and modifications that may be made herein without departing from the spirit and scope of the invention as defined in the claims.

What is claimed is:

1. A process for the manufacture of caustic soda comprising the steps of:
   providing a particulated, solid alkaline mineral comprised of a hydrated double salt of sodium carbonate and calcium carbonate said sodium and calcium carbonates being present therein in a molar ratio of about 1:1;
   heating said particulated, solid alkaline mineral to a temperature sufficient to remove water of hydrations therefrom and to partially decarbonate said particulated, solid alkaline mineral by removal of one mole of carbon dioxide per mole of said particulated, solid alkaline mineral and thereby provide a hot, friable, solid intermediate product comprised of sodium carbonate and calcium oxide;
   combining said hot, friable, solid intermediate product with water to effect hydration of the calcium oxide and causticization of the sodium carbonate, comprising said hot, friable, solid intermediate product, to provide an aqueous mixture of particulated calcium carbonate suspended in caustic soda solution; and
   separating and recovering the caustic soda solution from the aqueous mixture.

2. The process of claim 1 wherein said particulated solid alkaline mineral provided is selected from the group consisting of pirssonite and gaylussite which contain 2 and 5 moles of water of hydration, respectively.

3. The process of claim 1 wherein said particulated solid alkaline mineral is heated at a temperature of at least about 150° C. to effect drying of the alkaline mineral and at a temperature of at least about 750° C. to effect decarbonation of the particulated solid alkaline mineral.

4. The process of claim 3 wherein said particulated solid alkaline mineral is heated at a drying temperature ranging from about 175° C. to about 300° C., and then at a decarbonation temperature ranging from at least about 750° C.

5. The process of claim 1 wherein said particulated solid alkaline mineral is heated at a temperature of at least about 750° C. to simultaneously remove water of hydration from and to decarbonate said particulated solid alkaline mineral and thereby provide said hot, friable, solid intermediate product.

6. The process of claim 1 wherein the water is combined with the hot, friable, solid intermediate product in an amount at least equivalent to a theoretical amount required to effect hydration of the calcium oxide and causticization of the sodium carbonate.

7. The process of claim 6 wherein the amount of water is equivalent to the theoretical amount plus an excess amount of at least 5 percent.

* * * * *